United States Patent
Pechanec et al.

(10) Patent No.: US 10,679,162 B2
(45) Date of Patent: Jun. 9, 2020

(54) SELF-ORGANIZING WORKFLOW

(71) Applicant: Red Hat, Inc., Raleigh, NC (US)

(72) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 286 days.

(21) Appl. No.: 13/690,131

(22) Filed: Nov. 30, 2012

(65) Prior Publication Data
US 2014/0156337 A1    Jun. 5, 2014

(51) Int. Cl.
*G06Q 10/06* (2012.01)
*G06Q 10/10* (2012.01)

(52) U.S. Cl.
CPC ......... *G06Q 10/0633* (2013.01); *G06Q 10/06* (2013.01); *G06Q 10/06316* (2013.01); *G06Q 10/10* (2013.01)

(58) Field of Classification Search
CPC ............. G06Q 10/06; G06Q 10/06316; G06Q 10/0631; G06Q 10/0633; G06Q 10/103; G06Q 10/10; G06Q 10/067
USPC .......... 705/7.11, 7.12, 7.15, 7.26, 7.27, 301; 709/206, 217
See application file for complete search history.

(56) References Cited

U.S. PATENT DOCUMENTS

| | | | | |
|---|---|---|---|---|
| 2005/0091184 | A1* | 4/2005 | Seshadri | G06Q 10/107 |
| 2008/0278744 | A1* | 11/2008 | Marchesotti | H04N 1/603 |
| | | | | 358/1.15 |
| 2009/0119334 | A1* | 5/2009 | Ahern | G06Q 10/06 |
| 2012/0047078 | A1* | 2/2012 | Walter | G06Q 10/103 |
| | | | | 705/301 |

OTHER PUBLICATIONS

Cui Lin et al., A Reference Architecture for Scientific Workflow Management Systems and the View SOA Solution, IEEE Transactions on Services Computing, vol. 2, No. 1, Jan.-Mar. 2009, pp. 79-92.*
Shi Mellin et al., Workflow Management Systems: A Survey, International Conference on Communication Technology ICCT'98 Oct. 22-24, 1998 Beijing, China. pp. 1-6.*

* cited by examiner

*Primary Examiner* — Christine M Behncke
*Assistant Examiner* — Matthew H Divelbiss
(74) *Attorney, Agent, or Firm* — Lowenstein Sandler LLP (57) ABSTRACT

A system and a method are disclosed for self-organizing ad-hoc workflow. In one implementation, the present disclosure describes a self-learning system that monitors input conditions and monitors user steps in executing the ad-hoc workflow. When a new user executes the ad-hoc workflow process, the system receives a group of values for a set of input parameters, determines whether the received group of values has a matching group of values in a database, locates groups of values in the database with at least one matching value of the received group of values, determines a closest match between the received group of values and the located groups of values in the database using importance weights of input parameters in the set of input parameters, and selects the workflow associated with the closest match of the received group of values.

9 Claims, 6 Drawing Sheets

SELF-ORGANIZING WORKFLOW

TECHNICAL FIELD

The present disclosure relates to a computer system, and more specifically, to systems and methods for self-organizing ad-hoc workflow processes.

BACKGROUND

Business process management (BPM) offers a programmatic structure for designing transactions and executing them using automated decisions, tasks and sequence flows. For example, an insurance company can use BPM to automate the steps involved in processing insurance claims. BPM solutions typically include a process definition tool, an engine that executes process definitions, and tools that aid process monitoring A process definition tool allows a process designer to specify a definition of a business process using a particular business process language. Example languages may include the business process execution language (BPEL), web services flow language (WSFL) or business process modeling language (BPML). When a business process is defined, it can be deployed as a web application using, for example, the Java 2 Enterprise Edition (J2EE) web services deployment model.

Traditional business process management tools generally use strictly defined structured processes. Such processes can be inflexible in dynamic environments when it may not be clear which steps of a workflow should be executed and which steps should not be executed and under which conditions. Unstructured ad-hoc processes were introduced to overcome limitations of the traditional business process management tools. Characteristics of unstructured ad-hoc processes include: processes in which some activities might not need to be executed; processes in which some activities might be repeated more than once; processes in which the order for executing the activities is not always described; processes in which some activities may not be connected, sometimes resulting in several process fragments, etc. The activities of an unstructured ad-hoc process may be decided by the end user or an expert who selects which tasks he or she wants to execute, or by external events that might trigger certain tasks, or by the available data related to that process instance that defines what step or activity to execute next.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Methods and systems for handling self-organizing ad-hoc workflow processes are described. Ad-hoc processes take into consideration that the process can be structured based on the same or similar input conditions from previous iterations. The present disclosure describes a self-learning system that monitors input conditions and user steps in executing the ad-hoc workflow. When a new user executes the ad-hoc workflow process, the system evaluates the same or similar input conditions and can predict a business workflow process to offer to the user or expert to execute the workflow in the structured way as was done in the past. When the prediction is not correct, the system and method receives feedback from the user or expert. In such a case, the user may select the correct workflow process. The feedback is stored and used in future instances. As such, the system continues to improve its precision of predicting business process workflows.

In the following description, numerous details are set forth. It will be apparent that the aspects of the present disclosure may be practiced without these specific details. In some instances, well-known structures and devices are shown in block diagram form, rather than in detail, in order to avoid obscuring the disclosure.

Figure 1A:
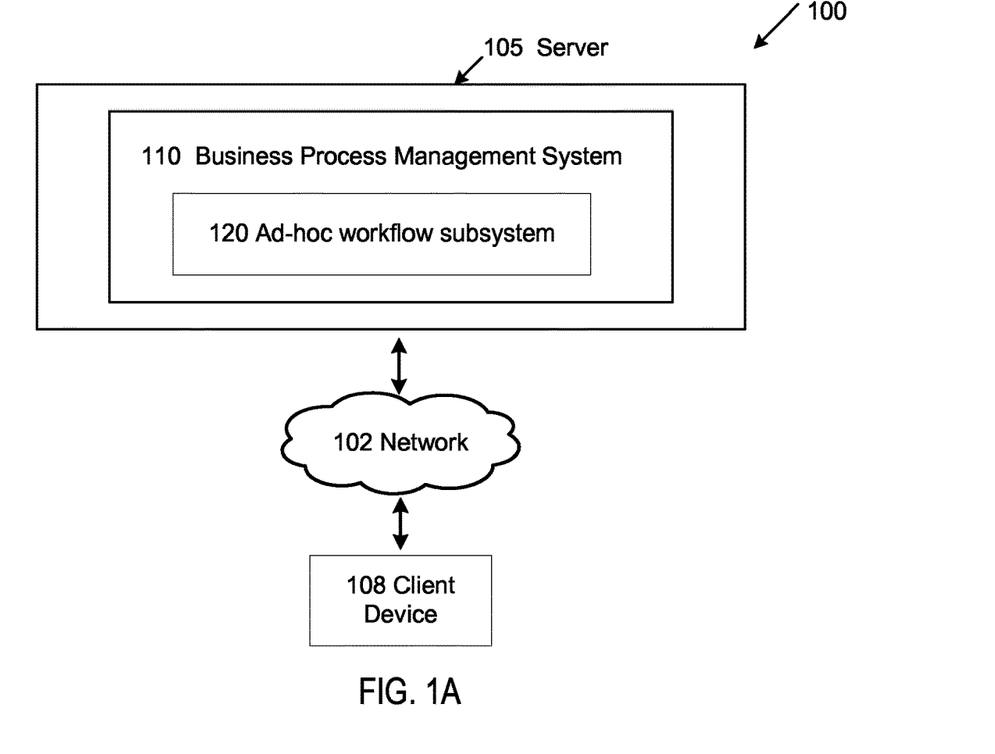
FIG. 1A depicts a block diagram illustrating an example network architecture in which implementations of the present disclosure can operate.

FIG. 1A illustrates a block diagram of a network architecture 100 in which examples of the present disclosure may operate. The network architecture 100 may include a server 105, a network 102, and a client device 108. The server 105 that may be a computer system to run services that serves the needs of users of other computers on a network. An example computer system is described in greater detail below in conjunction with FIG. 6.

The server 100 includes a business process management (BPM) system 110 for providing BPM functionality. In particular, the BPM system 110 may allow process developers to define business processes using, for example, BPEL, WSFL, BPML and the like. The BPM system 110 allows automated deployment of business processes as web applications. In one embodiment, the BPM system 110 uses the J2EE web services deployment model defined in the J2EE specification (e.g., J2EE version 1.4 specification).

Once the business process is deployed, the BPM system 110 can execute the business process using a BPM process engine. The BPM system 110 may provide user interfaces to allow users of clients 108 to interact with execution of the business process, monitor the execution of the business process, and view statistics about the business process execution. Users of clients 108 may include, for example, process developers, system administrators, business analysts, etc. The network architecture 100 may also include application servers (not shown) hosting external applications, and/or web servers (not shown) hosting external web services. During execution, the business process may interact with external applications and/or external web services by invoking external applications and/or web services or exchanging data with external applications and/or web services.

In one example, the BPM system 110 includes an ad-hoc workflow subsystem 120 for defining ad-hoc workflow processes. The ad-hoc workflow subsystem 120 is responsible for organizing, and creating ad-hoc workflow processes. An ad-hoc workflow process refers to a process that can have a varying number of steps and/or a varying order for executing the steps depending on different input parameters.

The client device 108 may be any device capable of communicating with the server 105 via the network 102 including, but not limited to, a computer, a smart phone, a wireless device, a tablet, and/or any suitable computing device. In an example, the communication device 108 may be a mobile device (e.g., a handheld device, smart phone or web portal device) that communicates with the network 102 via a wireless connection. In an example, the server 105 may determine and verify an electronic address, (e.g., email address, IP address, etc.) that is in connection with the client device 108 associated with a certain user or expert. It is also noted that the terms "user" or "expert" is used herein to refer to a person who uses the ad-hoc workflow subsystem 120 and may also be considered as a reliable source of technique or skill for correctly deciding or judging an appropriate process based on certain input conditions.

The network 102 may be any type of communications medium that allows for the user and the client device 108 to communicate with the server 105. The network 102 may be, for example, a private network (e.g., a local area network (LAN), a wide area network (WAN), intranet, etc.), a corporate network (e.g., a private network for an organization such as a corporation), and/or a public network (e.g., the Internet). For example, the user or expert may communicate with the server 105 via the network 102 and the client device 108.

Figure 1B:
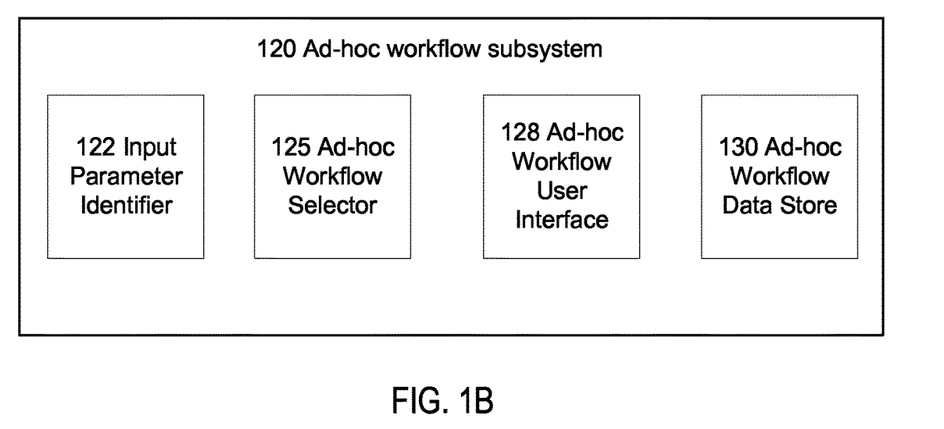
FIG. 1B is a block diagram of an example ad-hoc workflow subsystem in accordance with the present disclosure.

FIG. 1B illustrates a block diagram of one implementation of the ad-hoc workflow subsystem 120. The ad-hoc workflow subsystem 120 may include an input parameter identifier 122, an ad-hoc workflow selector 125, an ad-hoc workflow user interface 128, and an ad-hoc workflow data store 130.

The input parameter identifier 122 may be responsible for receiving a set of input parameter data and for identifying input parameters that may be related to or associated with a certain ad-hoc workflow process. The ad-hoc workflow selector 125 may be responsible for selecting an ad-hoc workflow process based on its associated input parameters. The ad-hoc workflow user interface 128 may be responsible for receiving user input related to business processes and displaying information related to business process. The ad-hoc workflow data store 130 may store a training data set used for training the ad-hoc workflow subsystem 120 to be able to receive input parameter values and predict what workflow process should be used for the received input parameter values. The training data set includes different definitions of ad-hoc workflow processes and their respective input parameters, as well as importance weights assigned to input parameters as will be discussed in more detail below.

Figure 2A:
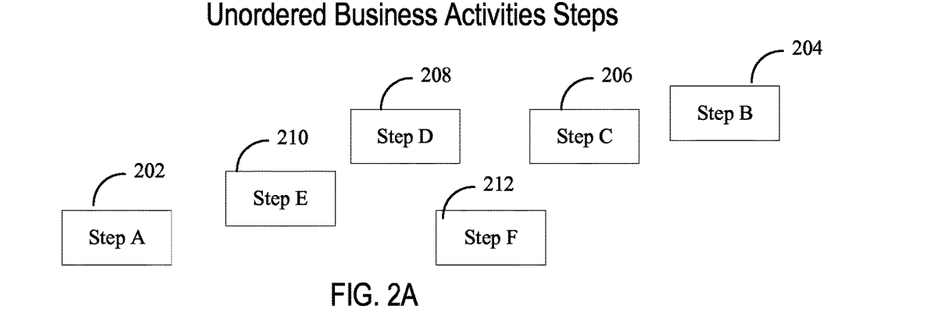
FIGS. 2A, 2B, and 2C illustrate examples of data included in a training set used for training an ad-hoc workflow subsystem in accordance with some implementations of the present disclosure.
Figure 2B:
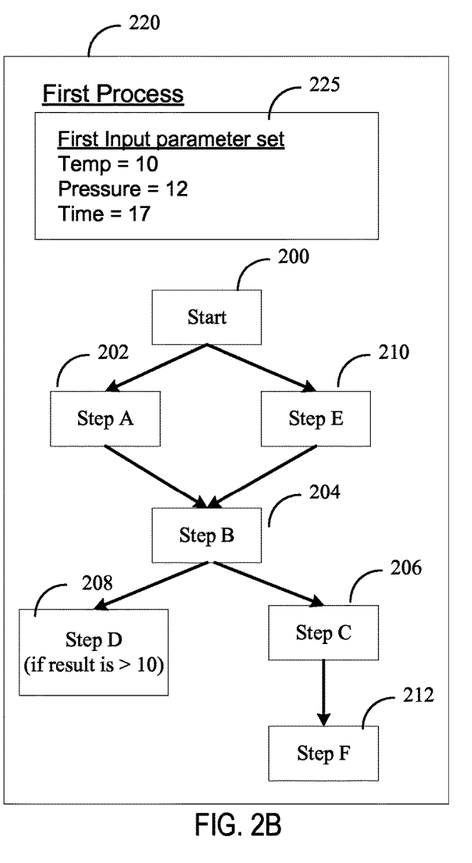
Figure 2C:
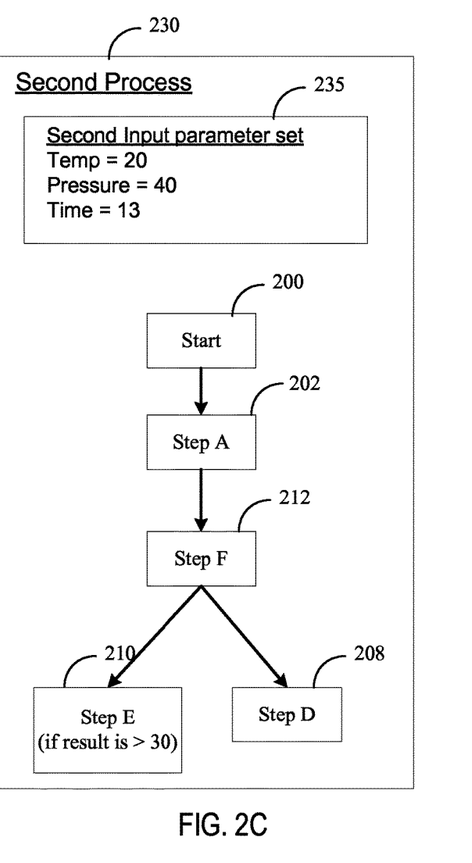

FIGS. 2A, 2B, and 2C illustrate examples of data included in a training set used for training an ad-hoc workflow subsystem in accordance with some implementations of the present disclosure.

FIG. 2A illustrates an example of a collection of business activities or steps, such as Step A 202, Step B 204, Step C 206, Step D 208, Step E 210, and Step F 212. Each of these steps may relate to, for example, a specific task or a business operation. These steps may be concatenated or connected to create a process. Generally, a process is a systematic pattern of activity with defined inputs, outputs, and purposes.

FIG. 2B depicts a first subset of training data, which includes a first input parameter set 225 and an associated first workflow defined by a user or expert via a business process language. A business process language is a process definition tool that allows a process designer to specify a definition of a business process using a specific business process language (e.g., business process execution language). At the Start 200 of the first process 220, the user or expert may review, via the ad-hoc workflow user interface 120, the input data and propose to proceed with Step A 202 and Step E 210 at the same time. After Step A 202 and Step E 210 are completed, the user or expert may review the results and proceed with Step B 204. After Step B 204 is completed, the user or expert may examine the results and decide to proceed with Step C 206 and Step D 208, based on a certain condition (e.g., if the result of Step B 204 is greater than 10). After Step C 206 is completed, the user or expert decides to proceed with Step F 212, at which the first process 220 is complete. In an example, the first process 220 and the associated first input parameter set 225 may be received by the ad-hoc workflow subsystem 120 via the ad-hoc workflow user interface 128 and stored in the ad-hoc workflow data store 130 as part of the training data.

FIG. 2C depicts a second subset of training data, which includes a second input parameter set 235 and an associated second workflow defined by the user or expert using a business process language. At the Start 200 of the second process 230, the user or expert may review the input data and propose to proceed with Step A 202. After Step A 202 is completed, the user or expert may review the results and proceed with Step F 212. After Step F 212 is completed, the user or expert may examine the results and decide to proceed with Step E 210 and Step D 208, based on a certain condition (e.g., if the result of Step F 212 is greater than 30). After Step E 210 and Step D 208 are completed, the second process 230 is complete. In an example, the second process 230 and the associated second input parameter set 235 may be received by the ad-hoc workflow subsystem 120 via the ad-hoc workflow user interface 128. It is noted that, contrary to the first process 220, Step B 204 and Step C 206 are not used on the second process 230. The second process 230 and the associated second input parameter set 235 may be received by the ad-hoc workflow subsystem 120 via the ad-hoc workflow user interface 128 and stored in the ad-hoc workflow data store 130 as part of the training data.

When the training data is collected as discussed above, the ad-hoc workflow subsystem 120 may apply a machine learning algorithm to the training data to create importance weights for the input parameters. An importance weight indicates which input parameters influence a resulting workflow more and which input parameters are less significant for the number of steps and/or their order in the workflow. The ad-hoc workflow subsystem 120 may receive additional training data including a new set of input parameters and an associated workflow, and may update the importance weights by applying machine learning to the additional training data.

Figure 3:
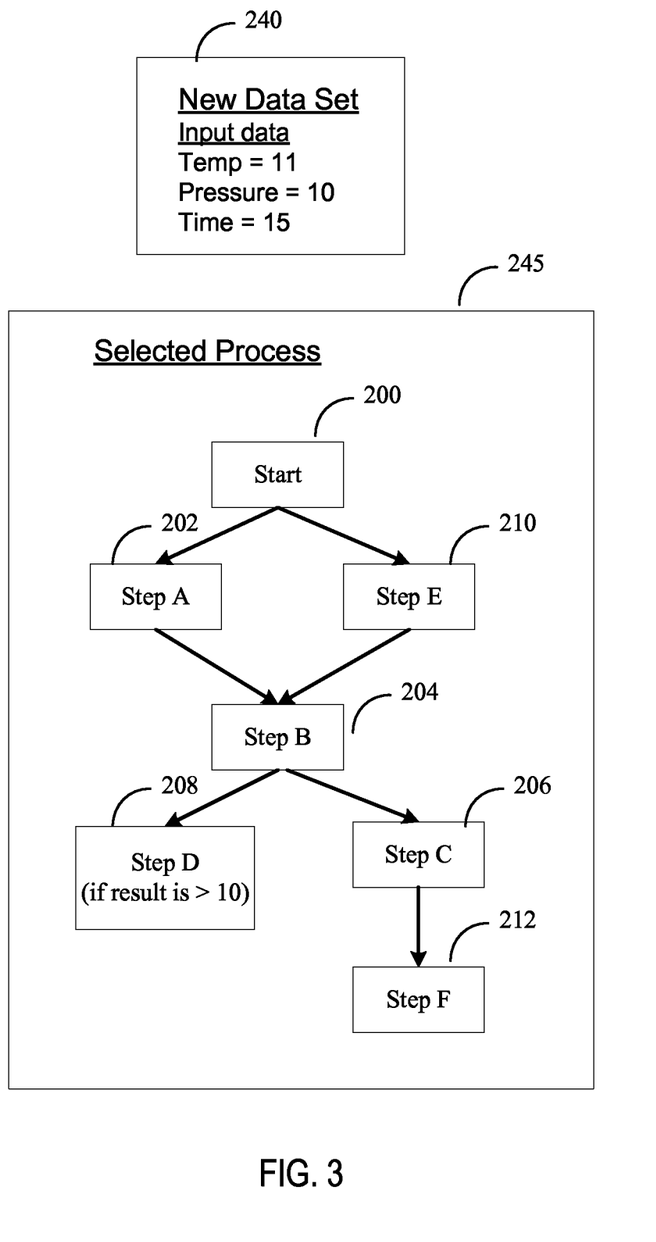
FIG. 3 illustrates an example of a workflow process selection in accordance with some implementations of the present disclosure.

FIG. 3 illustrates an example of a workflow process selection. In an example, FIG. 3 depicts a new subset of training data, which includes a new data set 240 and an associated selected workflow process 245 defined by the user or expert using a business process language. The new data set 240 may be received by the ad-hoc workflow subsystem 120 from the user or from an external event that triggers a request for a suitable process. The ad-hoc workflow subsystem 120 may compare the new data set 240 with each set of input parameters (e.g., the first input parameter set 225 and the second input parameter set 235). The ad-hoc workflow subsystem 120 may use the comparison to determine that the new data set 240 is most closely aligned with the first input parameter set 225 and as such, selects the associated first process 220. The ad-hoc workflow subsystem 120 may then send a message to the user or expert via the ad-hoc user interface 120 indicating the selection of the first process 220.

In response, the user or expert may either i) send an acknowledgement message to the ad-hoc workflow subsystem 120 indicating that the selected first process 220 is correct; ii) modify the selected first process 220 and submit the modified first process 220 to the ad-hoc workflow subsystem 120; iii) create a new process to be associated with the new data set 240; or iv) indicate that the selected first process 220 is not correct and request the ad-hoc workflow subsystem 120 to select a different process.

If the user or expert indicates that the selected first process 220 is correct, then the new data set 240 is associated with the first process 220 in the workflow data store 130, thereby effectively broadening the parameter values of the first process 220.

If the user or expert modifies the selected first process 220 or provides a new process, then the new data set 240 is associated with the resulting process in the workflow data store 130. The ad-hoc workflow subsystem 120 can then apply a machine learning algorithm to the modified contents of the workflow data store 130 to cerate updated importance weights for the input parameters.

Figure 4:
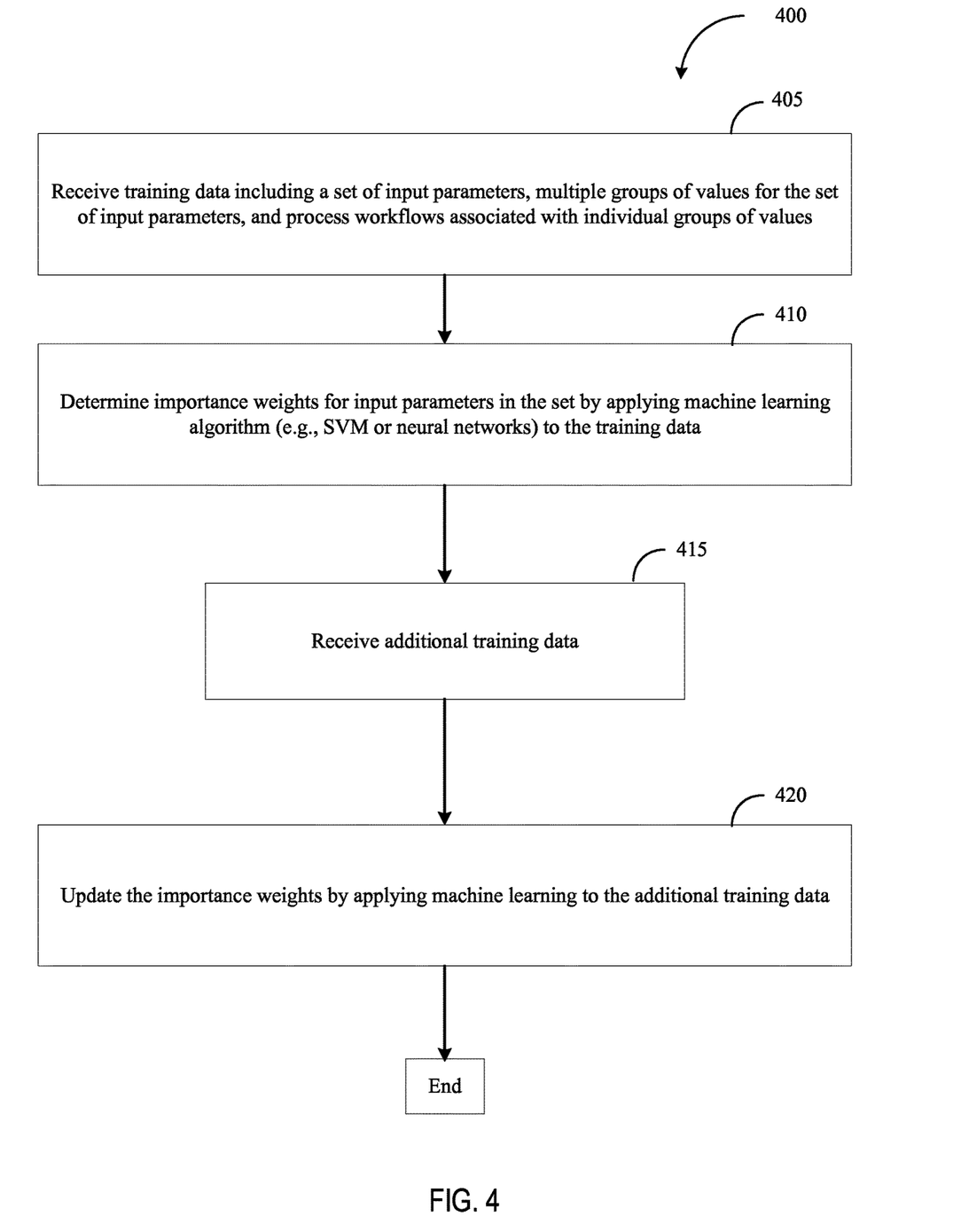
FIG. 4 depicts a flow diagram illustrating a method for training an ad-hoc workflow subsystem in accordance with some implementations of the present disclosure.

FIG. 4 depicts a flow diagram of aspects of an example method 400 for training an ad-hoc workflow subsystem. The method 400 may be performed by machine learning processing logic that may include hardware (e.g., circuitry, dedicated logic, programmable logic, microcode, etc.), software (e.g., instructions run on a processing device to perform hardware simulation), or a combination thereof. In one example, the method 400 may be performed by the ad-hoc workflow subsystem 120 of FIG. 1A.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 4, the method begins at block 405, where the ad-hoc workflow subsystem 120 receives training data including a set of input parameters (e.g, the first input parameter set 225 or the second input parameter set 235), multiple groups of values for the set of input parameters, and process workflows associated with individual groups of values from the user or expert. At block 410, the ad-hoc workflow subsystem 120 determines importance weights of input parameters in the set by applying machine learning algorithm to the training data (or it may update previously-created importance weights). Examples of machine learning algorithms include support vector machines (SVMs) and neural networks.

SVMs are supervised learning models with associated learning algorithms that analyze data and recognize patterns, used for classification and regression analysis. The basic SVM takes a set of input data and predicts, for each given input, which of two possible classes forms the output, making it a non-probabilistic binary linear classifier.

Neural networks are a form of a multiprocessor computer system that includes an interconnected group of artificial neurons that processes information using a connectionist approach to computation. A neural network is an adaptive system that changes its structure during a learning phase. Neural networks are used to model complex relationships between inputs and outputs or to locate patterns in data.

In an example, the ad-hoc workflow subsystem 120 may use a machine learning algorithm to determine the importance weights by reviewing the historical content in the data store 130. Such a review may reveal that certain input parameters are considered to be more important than others. A weighting system may be applied by the ad-hoc workflow subsystem 120 to assign high weights to important parameters in the training data and low weights to unimportant parameters in the training data. In another example, the ad-hoc workflow subsystem 120 may receive importance weight information from a user or expert for the input parameters.

At block 415, the ad-hoc workflow subsystem 120 may receive additional training data (e.g., a new data set 240 including input data and a process workflow 245 associated with the new data set 240.). The additional training data may be received from a user or expert, or from the result of a successful execution of the associated process workflow.

At block 420, the ad-hoc workflow subsystem 120 may use a machine learning algorithm to update the importance weights by applying machine learning to the additional training data. For example, the ad-hoc workflow subsystem 120 may locate and retrieve a same or similar process workflow and compare the associated input data with that of the additional training data. If a value for a specific input parameter associated with the additional training data differs greatly from the value for the input parameter that is associated with the retrieved process workflow, then the ad-hoc workflow subsystem 120 may determine that this input parameter is relatively unimportant and thus assign a low importance weight to this input parameter. The updated importance weights may be stored in the data store 130 for the next iteration, and the method 400 ends.

Figure 5:
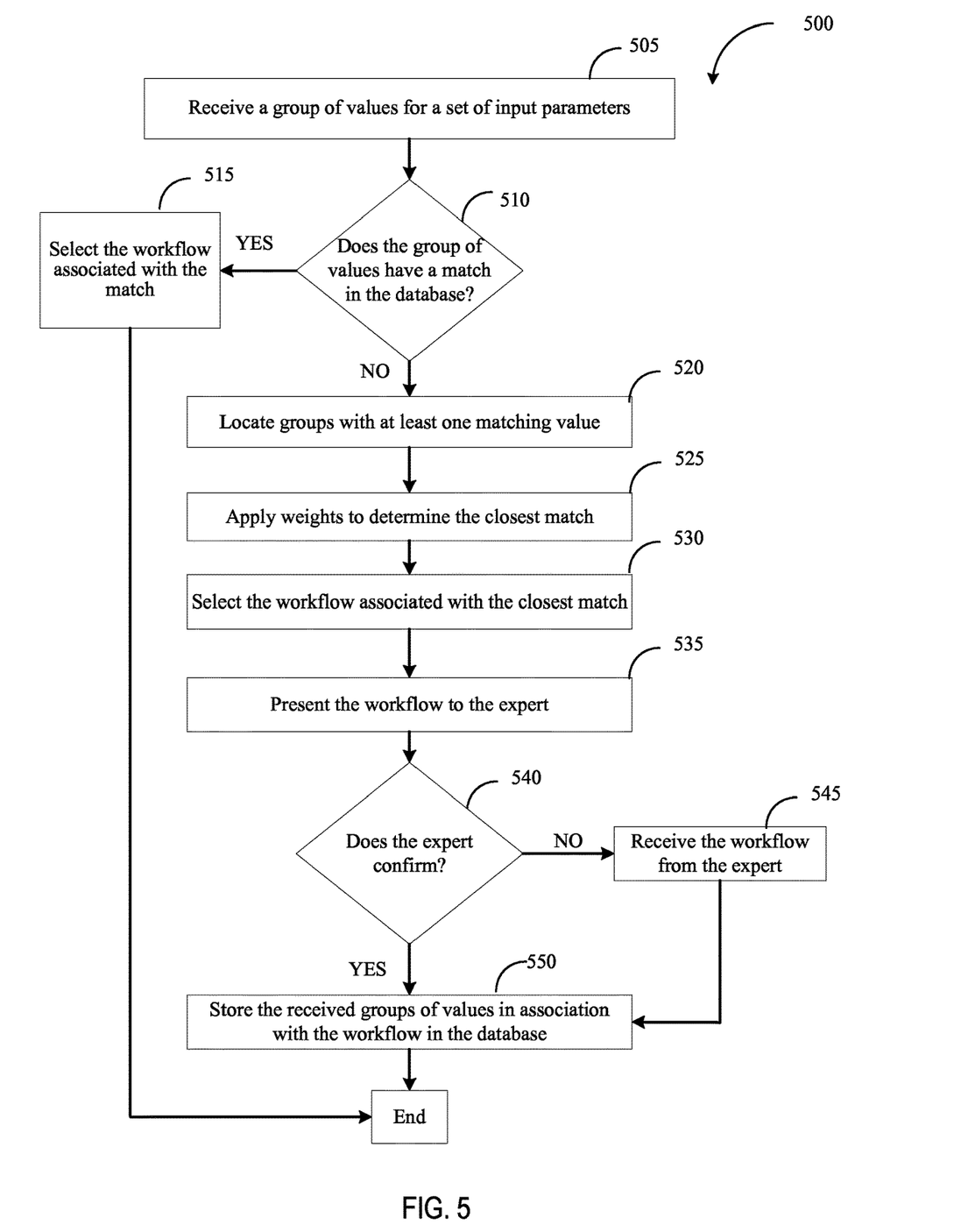
FIG. 5 depicts a flow diagram illustrating a method for selecting a workflow process in accordance with some implementations of the present disclosure.

FIG. 5 depicts a flow diagram of aspects of an example method 500, for selecting a workflow process. The method 500 may be performed by processing logic that may include hardware (e.g., circuitry, dedicated logic, programmable logic, microcode, etc.), software (e.g., instructions run on a processing device to perform hardware simulation), or a combination thereof. In one example, the method 500 may be performed by the ad-hoc workflow subsystem 120 of FIG. 1A.

At block 505, the ad-hoc workflow subsystem 120 receives a group of values for a set of input parameters. This group of values may be received from another system in response to a trigger from an external source. This external source may be, for example, a business event or outcome that triggers the execution of the ad-hoc workflow subsystem 120. At block 510, the ad-hoc workflow subsystem 120 determines whether the group of values has a match with a stored group of values in the data store 130. If a match is determined, then at block 515 the ad-hoc workflow subsystem 120 selects the workflow that is associated with the match and the method 500 ends.

At block 510, if the group of values does not have a match in the data store 130, then at block 520 the ad-hoc workflow subsystem 120 locates groups of values with at least one matching value. At block 525, the ad-hoc workflow subsystem 120 applies importance weights to the groups of values with at least one matching value to determine the group of values with the closest match to the received group of values. At block 530, the ad-hoc workflow subsystem 120 selects the workflow that is associated with the group of values that are determined to be the closest match. At block 535, the ad-hoc workflow subsystem 120 presents the selected workflow to the expert.

At block 540, the expert confirms whether the selected workflow that is associated with the group of values that are determined to be the closest match is indeed the correct workflow. If the selected workflow is not the correct workflow, then at block 545, the ad-hoc workflow subsystem 120 receives the correct workflow from the expert. At block 550, the ad-hoc workflow subsystem 120 stores the received group of parameter values in association with the correct workflow in the database, and the method 550 ends.

At block 540, if the expert confirms that the selected workflow is the correct workflow, then at block 550, the ad-hoc workflow subsystem 120 stores the received group of parameter values in association with the correct workflow in the database and the method 550 ends.

Figure 6:
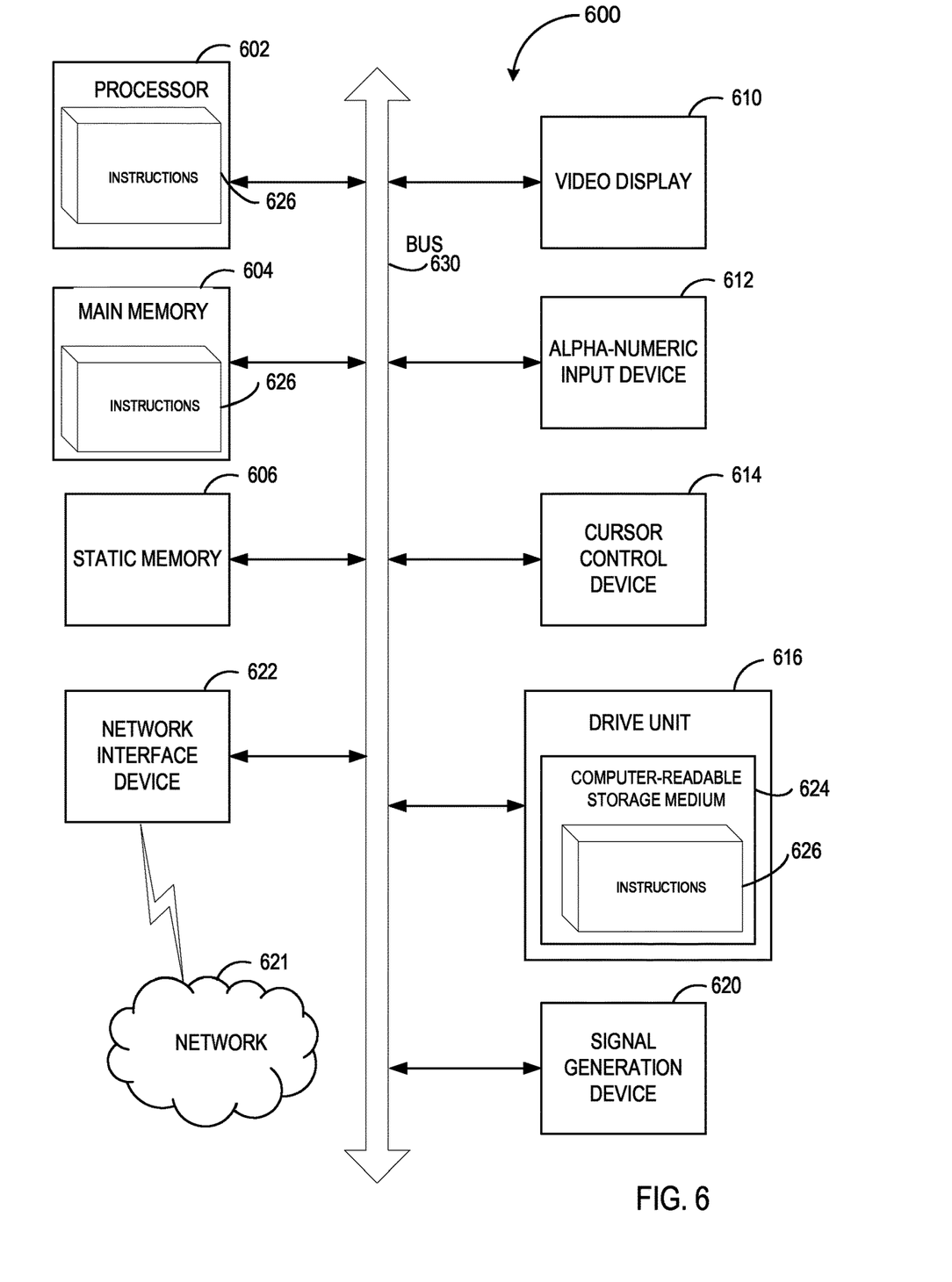
FIG. 6 illustrates an example of a diagrammatic representation of a machine in the form of a computer system.

FIG. 6 illustrates a diagrammatic representation of a machine in the form of a computer system 600 within which a set of memory instructions 626, for causing the machine to perform any one or more of the methodologies discussed herein, may be executed. In alternative example, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processor 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the ad-hoc workflow subsystem 120 for performing the operations and steps discussed herein.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 (e.g., instructions executed by the ad-hoc workflow subsystem 120) for the computer data processing system 100 embodying any one or more of the methodologies or functions described herein. The instructions 626 for the computer data processing system 100 may also reside, completely or at least partially, within the main memory 604 and/or within the processing device 602 during execution thereof by the computer system 600, the main memory 604 and the processing device 602 also constituting computer-readable storage media. The instructions 626 for the computer data processing system 100 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing," "monitoring," "determining," "adjusting," "sending," "receiving," "authenticating," "refraining," "identifying," "specifying," "granting," "accessing," "assigning," "executing," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, by a processing device, a first group of values for a set of input parameters from an external system executing an ad-hoc workflow process;
   determining the first group of values does not have a matching group of values in a database storing training data comprising a plurality of groups of input parameters generated as a result of previous iterations of one or more workflow processes;
   locating a second group of values in the training data stored in the database with at least one matching value of the first group of values;
   locating a third group of values in the training data stored in the database with at least one matching value of the first group of values;
   determining, by the processing device, importance weights for the input parameters in the set of input parameters by applying machine learning processing to a training data set comprising a first workflow process defined using a process execution language, wherein the importance weights are determined based on at least one of a number of steps of the first workflow process or an order of the steps of the first workflow process, wherein a first importance weight associated with a first input parameter of the set of input parameters is higher than a second importance weight associated with a second input parameter of the set of input parameters;
   determining, by the processing device, a match between a first value of the first group of values associated with the first input parameter and a second value of the second group of values associated with the first input parameter, wherein the match is determined using the first importance weight of the first input parameter of the set of input parameters;
   in response to determining the match, selecting a second workflow process associated with the second group of values for execution using the first group of values;
   receiving a modification to an order of execution of steps of the second workflow process to generate a modified workflow process comprising an updated order of execution of the steps of the second workflow process;
   executing the modified workflow process using the updated order of execution of the steps of the second workflow process to generate additional training data;
   storing the additional training data generated by the execution of the modified workflow process;
   identifying a stored workflow process and associated input data comprising the first input parameter;
   in response to receiving the modification, updating the importance weights of the input parameters in the set of input parameters by applying the machine learning processing to the additional training data and the input data associated with the stored workflow process, wherein a first updated importance weight is assigned to the first input parameter in view of a comparison to determine a difference between the first value of the first input parameter of the input data associated with the stored workflow process and an additional value of the first input parameter of the additional training data;
   storing, in the database, an association between the first group of values, updated importance weights, and the modified workflow process; and
   executing the modified workflow process using the first group of values and the updated importance weights.

2. The method of claim 1, further comprising:
   receiving a confirmation that the first group of values corresponds to the second workflow.

3. The method of claim 1, further comprising:
   receiving a confirmation that the first group of values does not correspond to the second workflow;
   receiving a third workflow; and
   storing, in the database, an updated association between the first group of values and the third workflow.

4. A system comprising:
   a memory to store instructions; and
   a processing device operatively coupled to the memory, the processing device to execute the instructions to:
      receive a first group of values for a set of input parameters from an external system executing an ad-hoc workflow process;
      determine the first group of values does not have a matching group of values in a database storing training data comprising a plurality of groups of input parameters generated as a result of previous iterations of one or more workflow processes;

locate a second group of values in the training data stored in the database with at least one matching value of the first group of values;

locate a third group of values in the training data stored in the database with at least one matching value of the first group of values;

determine importance weights for the input parameters in the set of input parameters by applying machine learning processing to a training data set comprising a first workflow process defined using a process execution language, wherein the importance weights are determined based on at least one of a number of steps of the first workflow process or an order of the steps of the first workflow process, wherein a first importance weight associated with a first input parameter of the set of input parameters is higher than a second importance weight associated with a second input parameter of the set of input parameters;

determine a match between a first value of the first group of values associated with the first input parameter and a second value of the second group of values associated with the first input parameter, wherein the match is determined using the first importance weight of the first input parameter of the set of input parameters;

in response to the match, select a second workflow process associated with the second group of values for execution using the first group of values;

receive a modification to an order of execution of steps of the second workflow process to generate a modified workflow process comprising an updated order of execution of the steps of the second workflow process;

executing the modified workflow process using the updated order of execution of the steps of the second workflow process to generate additional training data;

store the additional training data generated by the execution of the modified workflow process;

in response to the modification, update the importance weights of the input parameters in the set of input parameters by applying the machine learning processing to the additional training data and the input data associated with the stored workflow process, wherein a first updated importance weight is assigned to the first input parameter in view of a comparison to determine a difference between the first value of the first input parameter of the input data associated with the stored workflow process and an additional value of the first input parameter of the additional training data;

store, in the database, an association between the first group of values, updated importance weights, and the modified workflow process; and execute the modified workflow process using the first group of values and the updated importance weights.

5. The system of claim 4, the processing device to:
receive a confirmation that the first group of values is associated with the modified workflow.

6. The system of claim 4, the processing device to:
receive a confirmation that the first group of values is not associated with the modified workflow;
receive a new workflow; and
associate the first group of values with the new workflow in the database.

7. A non-transitory computer readable storage medium including instructions that, when executed by a processing device, cause the processing device to:

receive a first group of values for a set of input parameters from an external system executing an ad-hoc workflow process;

determine the first group of values does not have a matching group of values in a database storing training data comprising a plurality of groups of input parameters generated as a result of previous iterations of one or more workflow processes;

locate a second group of values in the training data stored in the database with at least one matching value of the first group of values;

locate a third group of values in the training data stored in the database with at least one matching value of the first group of values;

determine importance weights for the input parameters in the set of input parameters by applying machine learning processing to a training data set comprising a first workflow process defined using a process execution language, wherein the importance weights are determined based on at least one of a number of steps of the first workflow process or an order of the steps of the first workflow process, wherein a first importance weight associated with a first input parameter of the set of input parameters is higher than a second importance weight associated with a second input parameter of the set of input parameters;

determine a match between a first value of the first group of values associated with the first input parameter and a second value of the second group of values associated with the first input parameter, wherein the match is determined using the first importance weight of the first input parameter of the set of input parameters;

in response to the match, select a second workflow process associated with the second group of values for execution using the first group of values;

receive a modification to an order of execution of steps of the second workflow process to generate a modified workflow process comprising an updated order of execution of the steps of the second workflow process;

execute the modified workflow process using the updated order of execution of the steps of the second workflow process to generate additional training data;

store the additional training data generated by the execution of the modified workflow process;

in response to the modification, update the importance weights of the input parameters in the set of input parameters by applying the machine learning processing to the additional training data and the input data associated with the stored workflow process, wherein a first updated importance weight is assigned to the first input parameter in view of a comparison to determine a difference between the first value of the first input parameter of the input data associated with the stored workflow process and an additional value of the first input parameter of the additional training data;

store, in the database, an association between the first group of values, updated importance weights, and the modified workflow process; and execute the modified workflow process using the first group of values and the updated importance weights.

8. The non-transitory computer readable storage medium of claim 7, the processing device to:
receive a confirmation that the first group of values is associated with the modified workflow.

9. The non-transitory computer readable storage medium of claim 7, the processing device to:
   receive a confirmation that the first group of values is not associated with the modified workflow;
   receive a new workflow; and
   associate the first group of values with the new workflow in the database.

\* \* \* \* \*